US012614937B2

(12) United States Patent
Kolehmainen

(10) Patent No.: US 12,614,937 B2
(45) Date of Patent: Apr. 28, 2026

(54) ELEMENT WITH MAGNETIC POLES FOR THE ROTOR OF AN AXIAL FLUX ELECTRIC MACHINE

(71) Applicants: RENAULT S.A.S., Boulogne Billancourt (FR); WHYLOT, Cambes (FR)

(72) Inventor: Jere Kolehmainen, Saint-Aubin-lès-Elbeuf (FR)

(73) Assignees: AMPERE S.A.S., Boulogne-Billancourt (FR); WHYLOT, Cambes (FR)

( * ) Notice: Subject to any disclaimer, the term of this patent is extended or adjusted under 35 U.S.C. 154(b) by 204 days.

(21) Appl. No.: 18/258,179

(22) PCT Filed: Dec. 14, 2021

(86) PCT No.: PCT/EP2021/085596
§ 371 (c)(1),
(2) Date: Jun. 16, 2023

(87) PCT Pub. No.: WO2022/128983
PCT Pub. Date: Jun. 23, 2022

(65) Prior Publication Data
US 2024/0055921 A1 Feb. 15, 2024

(30) Foreign Application Priority Data
Dec. 17, 2020 (FR) ...................................... 2013489

(51) Int. Cl.
*H02K 1/2796* (2022.01)
*H01F 7/02* (2006.01)
(Continued)

(52) U.S. Cl.
CPC ......... *H02K 1/2796* (2022.01); *H01F 7/0221* (2013.01); *H02K 1/02* (2013.01);
(Continued)

(58) Field of Classification Search
CPC ...... H02K 1/2796; H02K 1/182; H02K 15/03; H02K 15/035; H02K 15/121; H02K 7/0221; H01F 7/0221
(Continued)

(56) References Cited

U.S. PATENT DOCUMENTS

| | | | | | |
|---|---|---|---|---|---|
| 5,488,260 A | * | 1/1996 | Heyraud | ................ | H02K 1/278 29/598 |
| 5,861,695 A | * | 1/1999 | Brassard | .................. | H02K 1/17 310/156.19 |

(Continued)

FOREIGN PATENT DOCUMENTS

| | | | | |
|---|---|---|---|---|
| CN | 111049287 A | | 4/2020 | |
| CN | 111884368 A | * | 11/2020 | ............. H02K 3/345 |

(Continued)

OTHER PUBLICATIONS

International Search Report for PCT/EP2021/085596 mailed Apr. 7, 2022, 7 pages.
(Continued)

*Primary Examiner* — Oluseye Iwarere
*Assistant Examiner* — Daniel K Schlak
(74) *Attorney, Agent, or Firm* — NIXON & VANDERHYE

(57) ABSTRACT
Disclosed is an element with magnetic poles for the rotor of an axial flux electric machine, including an assembly of several individual magnets and a flange, at least a first part of which surrounds the assembly in order to immobilise the individual magnets in position. At least one part of the flange is made from a material including a mixture of polymer and magnet powder.

10 Claims, 4 Drawing Sheets

(51) Int. Cl.

| | | |
|---|---|---|
| *H02K 1/02* | (2006.01) |
| *H02K 1/18* | (2006.01) |
| *H02K 15/03* | (2025.01) |
| *H02K 15/035* | (2025.01) |
| *H02K 15/12* | (2025.01) |

(52) U.S. Cl.
CPC ............. *H02K 1/182* (2013.01); *H02K 15/03* (2013.01); *H02K 15/035* (2025.01); *H02K 15/12* (2013.01); *H02K 2213/12* (2013.01)

(58) Field of Classification Search
USPC .................................................. 310/156.35
See application file for complete search history.

(56) References Cited

U.S. PATENT DOCUMENTS

| | | | | |
|---|---|---|---|---|
| 6,674,214 B1 * | 1/2004 | Knorzer | ............... | H02K 1/2796 |
| | | | | 310/268 |
| 2006/0022552 A1 * | 2/2006 | Zhu | ........................ | H02K 21/24 |
| | | | | 310/156.08 |
| 2011/0079325 A1 * | 4/2011 | Doi | ...................... | H02K 1/2766 |
| | | | | 148/108 |
| 2011/0080065 A1 * | 4/2011 | Watanabe | ............ | H02K 1/2798 |
| | | | | 310/156.32 |
| 2011/0148224 A1 * | 6/2011 | Tokoi | ................... | H02K 1/2796 |
| | | | | 310/43 |
| 2012/0104894 A1 * | 5/2012 | Van Den Bossche | ........................ | |
| | | | | H02K 15/022 |
| | | | | 310/216.011 |
| 2012/0194025 A1 * | 8/2012 | Fubuki | ................... | H02K 15/03 |
| | | | | 310/156.38 |
| 2013/0175242 A1 * | 7/2013 | Lancaster-Larocque | .................... | |
| | | | | B28D 1/041 |
| | | | | 125/35 |
| 2013/0181565 A1 * | 7/2013 | Petro | ................... | H02K 15/022 |
| | | | | 310/156.33 |
| 2014/0167895 A1 * | 6/2014 | Miyata | ................. | H02K 1/2781 |
| | | | | 335/302 |
| 2016/0155567 A1 * | 6/2016 | Kim | .................... | H01F 41/0253 |
| | | | | 29/607 |
| 2017/0155291 A1 * | 6/2017 | Deàk | ...................... | H02K 1/182 |
| 2019/0140503 A1 * | 5/2019 | Sandner | ............... | H02K 1/2796 |
| 2020/0265868 A1 * | 8/2020 | Takahashi | ............ | G11B 5/5573 |
| 2021/0075280 A1 * | 3/2021 | Leonardi | .............. | H02K 1/2766 |
| 2021/0218290 A1 * | 7/2021 | Ravaud | ................. | H01F 7/0221 |
| 2021/0218300 A1 * | 7/2021 | Ravaud | ................... | H01F 7/021 |
| 2021/0218322 A1 * | 7/2021 | Mihaila | ................. | H02K 5/203 |
| 2021/0265884 A1 * | 8/2021 | Mayeur | ............... | H02K 15/121 |
| 2023/0223806 A1 * | 7/2023 | Mihaila | ................ | H01F 7/0221 |
| | | | | 310/216.074 |
| 2023/0274880 A1 * | 8/2023 | Yao | ........................ | H02K 15/03 |
| | | | | 29/607 |
| 2023/0299651 A1 * | 9/2023 | Kolehmainen | ...... | H02K 1/2795 |
| | | | | 29/598 |
| 2024/0213834 A1 * | 6/2024 | Lamarre | ............... | B33Y 10/00 |
| 2024/0296994 A1 * | 9/2024 | Kolehmainen | ..... | H01F 41/0286 |

FOREIGN PATENT DOCUMENTS

| | | | | | |
|---|---|---|---|---|---|
| FR | 2996378 A1 | | 4/2014 | | |
| FR | 3004025 A1 | * | 10/2014 | .............. | H02K 1/30 |
| FR | 3006124 A1 | * | 11/2014 | ............. | H02K 21/24 |
| FR | 3014255 A1 | * | 6/2015 | .............. | H02K 1/28 |
| FR | 3064422 A1 | | 9/2018 | | |
| FR | 3072222 A1 | * | 4/2019 | ............ | H02K 16/04 |
| JP | 57107010 A | * | 7/1982 | ............ | H02K 7/021 |
| JP | H10304610 A | | 11/1998 | | |
| WO | WO-2013176116 A1 | * | 11/2013 | .......... | H02K 1/2766 |
| WO | WO-2019243996 A1 | * | 12/2019 | .............. | H02K 1/30 |

OTHER PUBLICATIONS

Written Opinion of the ISA for PCT/EP2021/085596 mailed Apr. 7, 2022, 7 pages.

* cited by examiner

ELEMENT WITH MAGNETIC POLES FOR THE ROTOR OF AN AXIAL FLUX ELECTRIC MACHINE

CROSS-REFERENCE TO RELATED APPLICATIONS

This application is the U.S. national phase of International Application No. PCT/EP2021/085596 filed Dec. 14, 2021 which designated the U.S. and claims priority to FR Patent Application No. 2013489 filed Dec. 17, 2020, the entire contents of each of which are hereby incorporated by reference.

BACKGROUND OF THE INVENTION

Field of the Invention

The present invention generally relates to the field of electric machines.

It relates more specifically to an element with magnetic poles for a rotor of an axial flux electric machine.

It also relates to a rotor comprising such an element with magnetic poles, an axial flux electric machine comprising such a rotor, and a method for assembling such a rotor.

The invention has a particularly advantageous application in producing electric engines for electric or hybrid motor vehicles (car, lorry, bus, etc.). It applies more generally also to other motorised devices, such as, for example, lifts, cranes, etc.

Description of the Related Art

An axial flux electric machine generally comprises a stator and a rotor, an air gap separating these two types of elements. The rotor carries a series of large permanent magnets, while a series of coils is carried by the stator. When the coils are powered by an electric current, the rotor, which is integral with the output shaft of the engine, is subjected to a torque resulting from the magnetic field (the magnetic flux created being an axial flux).

To reduce the energy losses by eddy currents in the rotor, and thus increasing the performance of the electric machine, the large permanent magnets can be replaced by "elements with magnetic poles", each comprising a plurality of individual magnets of reduced sizes. Indeed, a large permanent magnet is subject to losses by eddy currents greater than its equivalent in small individual magnets.

The individual magnets are arranged closely to maximise the volume of magnetic material with respect to the volume of the corresponding element with a magnetic pole and thus improve the performance of the electric machine.

For example, a structure comprising small-sized individual magnets is known from document FR3064422. These individual magnets have the advantage of being able to form a close network by having a strong magnetic field. In this document, these individual magnets are connected together by means of a resin. In particular, this resin extends all around this individual magnet assembly, thus forming a "flange" securing the individual magnets together.

Filling the volume of the element with a magnetic pole with as many individual magnets as possible, while limiting the manufacturing costs has nevertheless proved to be complex. Indeed, the elements with magnetic poles generally have two rectilinear-shaped, but non-parallel edges. Arranging individual magnets of identical shapes thus necessarily generates empty spaces, filled by the resin, which decreases the magnetic effectiveness of the element with a magnetic pole, and therefore of the rotor.

SUMMARY OF THE INVENTION

In order to overcome the abovementioned disadvantage of the prior art, the present invention proposes an element with magnetic poles comprising an assembly of several individual magnets and a flange, a first part of which at least surrounds said assembly to immobilise the individual magnets in position, this flange being at least partially made of a composite material comprising a mixture of polymer and magnet powder.

Thus, the invention proposes to benefit all of the volume of the element with a magnetic pole to house the magnetic material there (the individual magnets and the magnet powder).

In this way, it is possible to use individual magnets of simple shapes and which are therefore inexpensive, even when they do not make it possible to fill all the volume of the element with a magnetic pole. The rest of the element with magnetic poles is indeed thus filled with composite material loaded with magnet powder. This material certainly has magnetic properties which are weaker than those of magnets, but very low losses.

Two inherent advantages are further provided by the invention. The first advantage is that, thanks to the complete filling of each element with magnetic poles with magnetic material, the torque ripples when the rotor rotates are reduced, which generates a decrease of vibrations and of noise. The second advantage is that the losses by eddy currents are reduced, which offers a better yield to the engine.

More specifically, the eddy currents are very low over composite material zones. Furthermore, the size of the composite material zones can be optimised to minimise the total losses, the vibrations and the noise. A variation in (continuous) smoothness of the magnetic material content from a non-magnetic zone to a fully magnetic zone is the best solution to reduce losses, vibrations and noise. A maximum quantity of magnetic material is the best solution to maximise the power and/or the torque of the engine over a short duration.

Other advantageous and non-limiting features of the element with a magnetic pole according to the invention, taken individually or according to all the technically possible combinations, are as follows:

the flange is fully made of said material;

the polymer is of the thermosetting type;

the individual magnets are distributed into one single group within which each individual magnet is in contact with at least one other individual magnet by way of a resin layer or (thin) glue which could integrate the magnet powder;

in a variant, the individual magnets are distributed in at least two distinct groups within which each individual magnet is in contact with at least one other individual magnet;

the flange comprises a second part which extends between said two groups.

The invention is also based on a rotor for an axial flux electric machine comprising a disc-shaped body which is centred on an axis of rotation and which delimits at least one housing for an element with magnetic poles such as mentioned above.

The invention also relates to an axial flux electric machine comprising at least one rotor such as mentioned above, and at least one disc-shaped stator centred on the axis of rotation of the rotor.

The invention is moreover based on a method for assembling a rotor such as mentioned above.

In a first embodiment, this method comprises steps of:

manufacturing the body, gluing individual magnets in at least one one-piece group, then casting said material on the individual magnets and polymerising said material to form at least one element with magnetic poles, installing each element with magnetic poles in each housing of the body, and fixing each element with magnetic poles on the body.

In a second embodiment, this method comprises steps of:

manufacturing the body, gluing individual magnets in at least one one-piece group, installing individual magnets in each housing of the body, and casting said material on the individual magnets and on the body, and polymerising said material.

In a third embodiment, this method comprises steps of:

manufacturing the body, installing each individual magnet in each housing of the body, and casting said material on the individual magnets and on the body, and polymerising said material.

In a fourth embodiment, this method comprises steps of:

manufacturing the body, creating at least one one-piece group of individual magnets by cutting a magnet block over a thickness corresponding to at least the thickness of the rotor, by leaving an uncut base of said magnet block holding said individual magnets together, casting said material on the individual magnets and polymerising said material, cutting the uncut base of the magnet block to form at least one element with magnetic poles, and installing each element with magnetic poles in each housing of the body.

Naturally, the different features, variants and embodiments of the invention can be associated with one another according to various combinations, insofar as they are not incompatible or exclusive from one another.

BRIEF DESCRIPTION OF THE DRAWINGS

The description below regarding the accompanying drawings, given as non-limiting examples, will make it understood what the invention consists of, and how it can be achieved.

In the Accompanying Drawings.

DETAILED DESCRIPTION

Figure 1:
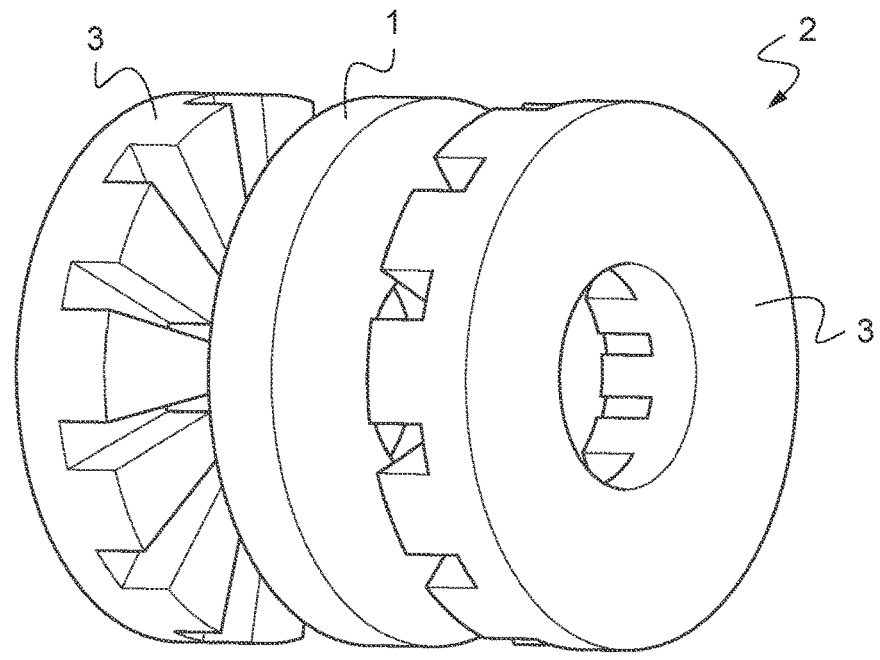
FIG. 1 is a schematic, perspective view of an axial flux electric machine according to the invention.

In FIG. 1, an axial flux electric machine 2 has been represented, in this case, an engine making it possible to propel an electric vehicle.

Such an electric machine comprises at least one rotor and at least one stator.

As shown in FIG. 1, this axial flux electric machine 2 comprises, in this case, a rotor 1 located between two stators 3.

The stators have flattened ring shapes and are equipped, on their faces located on the side of the rotor 1, with teeth around which electrically conductive wire windings are wound. When these windings are powered with electric current, they make it possible to generate a magnetic field.

Figure 2:
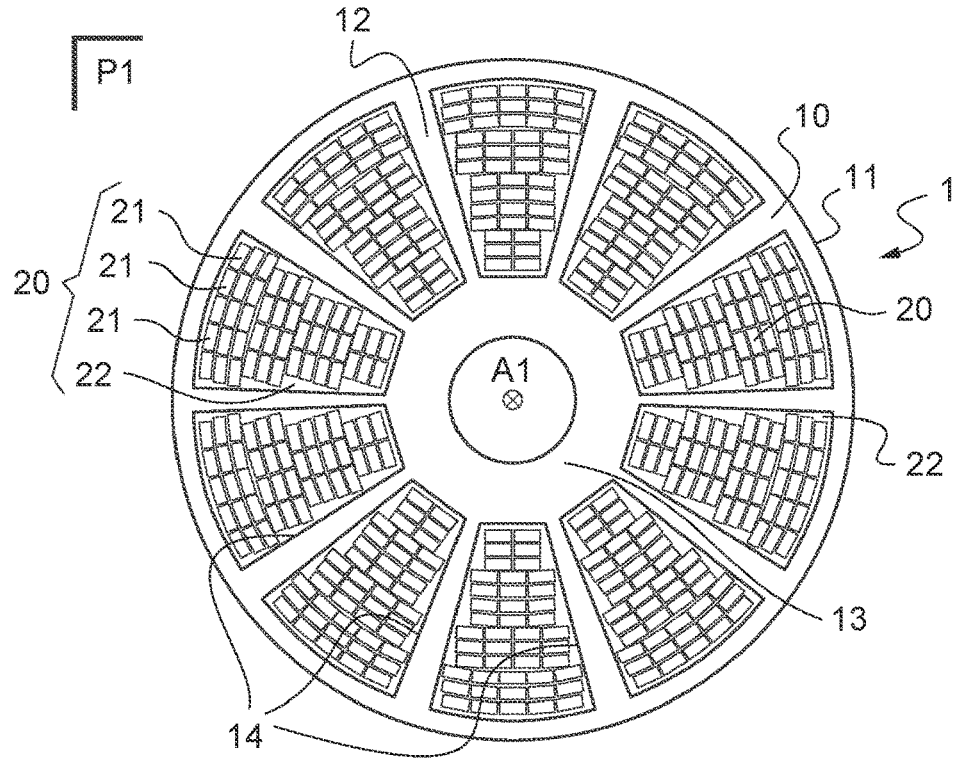
FIG. 2 is a schematic, cross-sectional view of the rotor of the electric machine of FIG. 1.

As shown in FIG. 2, the rotor 1, which more specifically forms the subject of the present invention, itself comprises an annular-shaped body 10 which houses a plurality of elements with magnetic poles 20 having the same function as permanent magnets.

The magnetic field generated by the windings is thus designed to act on the elements with magnetic poles 20 so as to make the rotor 1 rotate.

The body 10 has an overall disc shape, in that it is substantially circumscribed with a revolving cylinder about an axis, below called axis of rotation A1. The body 10 extends into a main plane P1 orthogonal to the axis of rotation. The main plane P1 is, in this case, the plane of FIG. 2.

The body 10 thus has two circular and flat faces, parallel to one another and to the main plane P1.

As shown in FIG. 2, the body 10 has a central orifice, of diameter strictly less than that of the stators 3, which is adapted to receive a transmission shaft (not represented) extending along the axis of rotation A1. The rotor 1 is provided to be fixed to this transmission shaft that it is intended to drive.

The body 10 can, for example, be made of an aluminium, steel, iron, titanium base, or an alloy containing these metals, all antimagnetic. It is, for example, made by a stack of metal sheets. In a variant, it could be constituted of a composite material loaded with glass or carbon fibres.

As shown in FIG. 2, the body 10 delimits a plurality of hollow housings 14. In this case, the body 10 has ten identical housings 14. The housings 14 are regularly distributed about the axis of rotation A1. This makes it possible to ensure a good balance of the rotor 1 when it is in rotation.

Each housing 14 preferably extends over the whole thickness of the body 10, such that each housing is through. This has the advantage of providing two opposite working surfaces located at distances very close to the stators 3. In a variant, end plates could be used to optimise the axial holding of the rotor.

As shown in FIG. 2, each housing 14 has, in this case, a mainly trapezoidal shape, with two substantially straight side edges (and substantially radial with respect to the axis of rotation A1), an outer edge substantially circular arc-shaped centred on the axis of rotation A1, and a straight inner edge.

In a variant, each housing 14 could have a different shape.

Given the shape of these housings 14, it can be said about the body 10 that it comprises three parts, namely a hub 13 engaged on the transmission shaft of the engine, a peripheral ring 11, and an assembly of ten spokes 12 which connect the hub 13 to the ring 11.

Each element with magnetic poles 20 has an identical shape, in negative, to that of the housing 14 in which it is inserted. Thus, each element with magnetic poles 20 is, in this case, of mainly trapezoidal shape.

All these elements with magnetic poles 20 are identical, even though below in this description, only one of them will be described.

This element with magnetic poles 20 therefore has a peripheral edge which comprises two flat sides (located in planes which are substantially radial with respect to the axis of rotation A1), a circular arc-shaped curved outer side substantially centred on the axis of rotation A1, and a flat inner side. In a variant, the inner side could be curved, which would, in particular, be the case if the rotor comprised a reduced number of elements with magnetic poles.

Moreover, it has two main faces located in the extension of the two faces of the body 10.

As shown in FIG. 2, this element with magnetic poles 20 comprises a plurality of small-sized permanent magnets (compared with that of the element 20). These small magnets will be called individual magnets 21 below.

In this case, each element with a magnetic pole 20 comprises at least ten individual magnets 21, and preferably, several tens of such magnets.

Advantageously, each individual magnet 21 has a rectangular parallelepiped shape, of length equal to the thickness of the body 10. Preferably, these individual magnets 21 have identical shapes. These individual magnets 21 are therefore inexpensive to manufacture in series. As an example, they can thus be manufactured by sectioning a long magnet block, this sectioning being obtained by cracking or sawing.

This can be any type of magnet. In this case, these are sintered neodymium magnets, commonly called NdFeB magnets. These magnets are composed of a neodymium, iron and boron alloy.

In a variant, this could be a ferrite magnet, for example SmCo magnets (Samarium-Cobalt) or AlNiCo magnets (mainly composed of aluminium, nickel and cobalt).

As will be described below, the individual magnets 21 are distributed into one or more groups of several individual magnets 21.

To ensure their cohesion, i.e. to ensure the relative immobilisation of the individual magnets against one another (even when the rotation speed of the rotor 1 is high and is greater than 20000 rotations per minute), the element with a magnetic pole 20 comprises a flange 22 which at least surrounds the peripheral edge of the individual magnets 21.

In a variant, this flange can even coat these magnets, i.e. surround them, but also cover them on the faces parallel to the main plane P1.

According to a particularly advantageous feature of the invention, the flange 22 is made of a composite material comprising a mixture of polymer and magnet powder.

These two non-miscible materials have different properties.

The polymer has a binder function, ensuring the above-mentioned function of immobilising individual magnets 21 against one another. It also has an electrical insulation and eddy current minimisation (or immobilisation) function between the magnetic powder grains. The magnet powder itself has the function of maximising the volume of magnetic material in the element with magnetic poles 20.

Indeed, the shape of the individual magnets 21 does not make it possible to fill all of the volume of the element with magnetic poles 20 with individual magnets, even though the flange has, in practice, a volume greater than the volume which would be necessary for it to ensure its abovementioned immobilisation function.

The polymer used will preferably be of the thermosetting type. In a variant, a thermoplastic variant could also be used, as long as it ensures the immobilisation function sought in all the temperature range which the engine can face. Bi-component epoxy, nylon, PPS glues could also be used.

The magnet powder is formed of crystals, for example of spherical shapes.

The type of polymer used, the size and the shape of these crystals and the crystal content in the polymer are the parameters on which it is possible to act so as to maximise the volume of magnetic material in the element with magnetic poles 20, while enabling the flange 22 to ensure its relative immobilisation function of the individual magnets 21.

The magnetic powder content by volume in the polymer material is preferably between 50 and 85%.

The diameter of the grains in the magnet powder is preferably between 2 and 100 micrometres ($\mu$m). It is, in particular, between 80 and 100 $\mu$m in case of injection moulding.

As an example, the material used can be one of those commercialised by the company Arnold Magnetic Technologies Corporation. In this example, a 61 to 65% content by volume of magnetic powder is used in case of injection moulding. In a variant, a method for pressing along one single axis can be used to manufacture magnets glued by compression (compacting is referred to), in order to obtain a 79% content by volume.

This company makes it possible to use a wide combination of magnetic materials and polymers, in particular: Ferrite, neodymium magnet (NdFeB), samarium-cobalt magnet (SmCo), Nylon 6, Nylon 12, polyphenylene sulphide (PPS), which is an opaque, rigid semi-crystalline thermoplastic material and having a high melting point.

Thus, "plastic pressed and bonded" elements with magnetic poles can be used, which are the result of the union between the thermoplastic binders and the permanent magnet powders.

In this case, the flange 22 is fully made of this material. In a variant, only one part of this flange could thus be produced.

Figure 3:
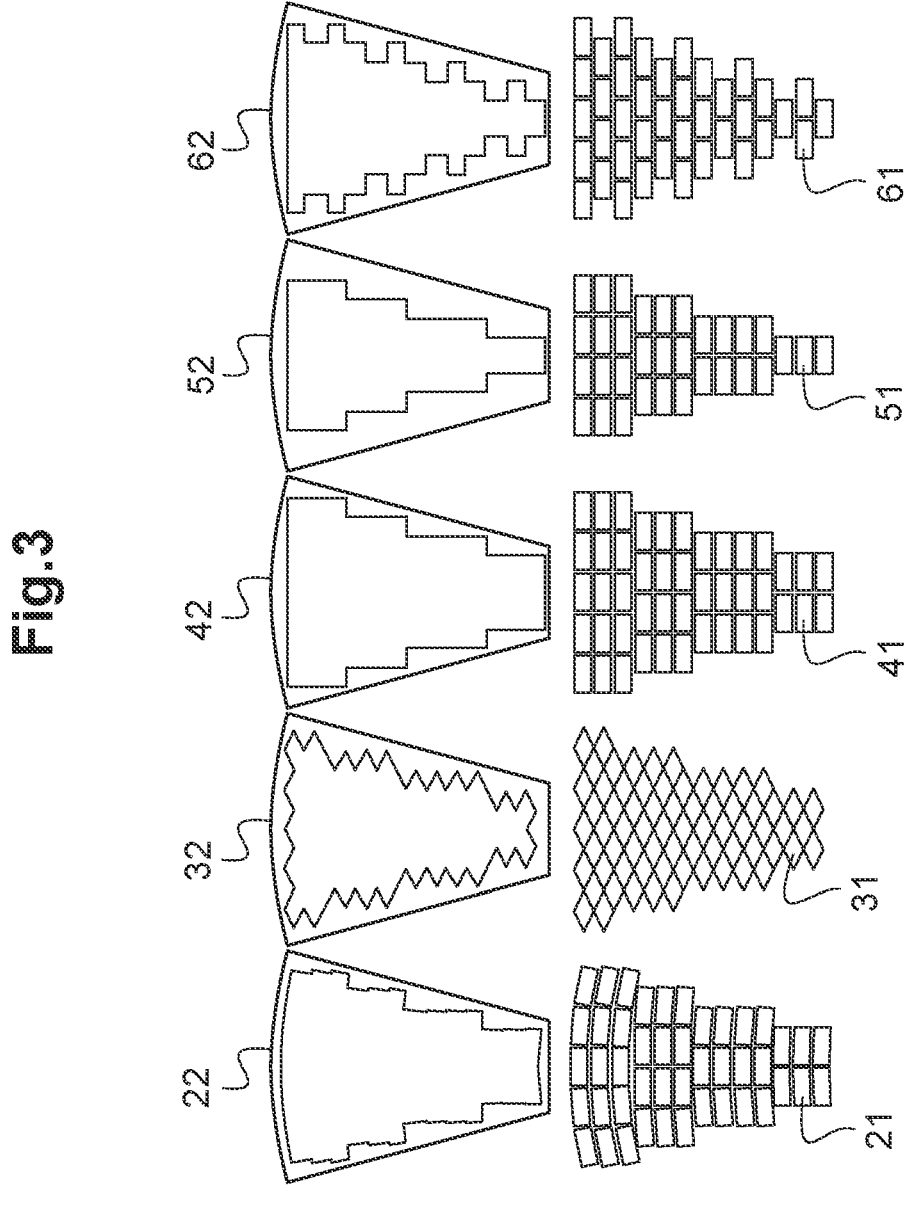
FIG. 3 illustrates five first embodiments of an element with magnetic poles which can be used in the rotor of FIG. 2.
Figure 4:
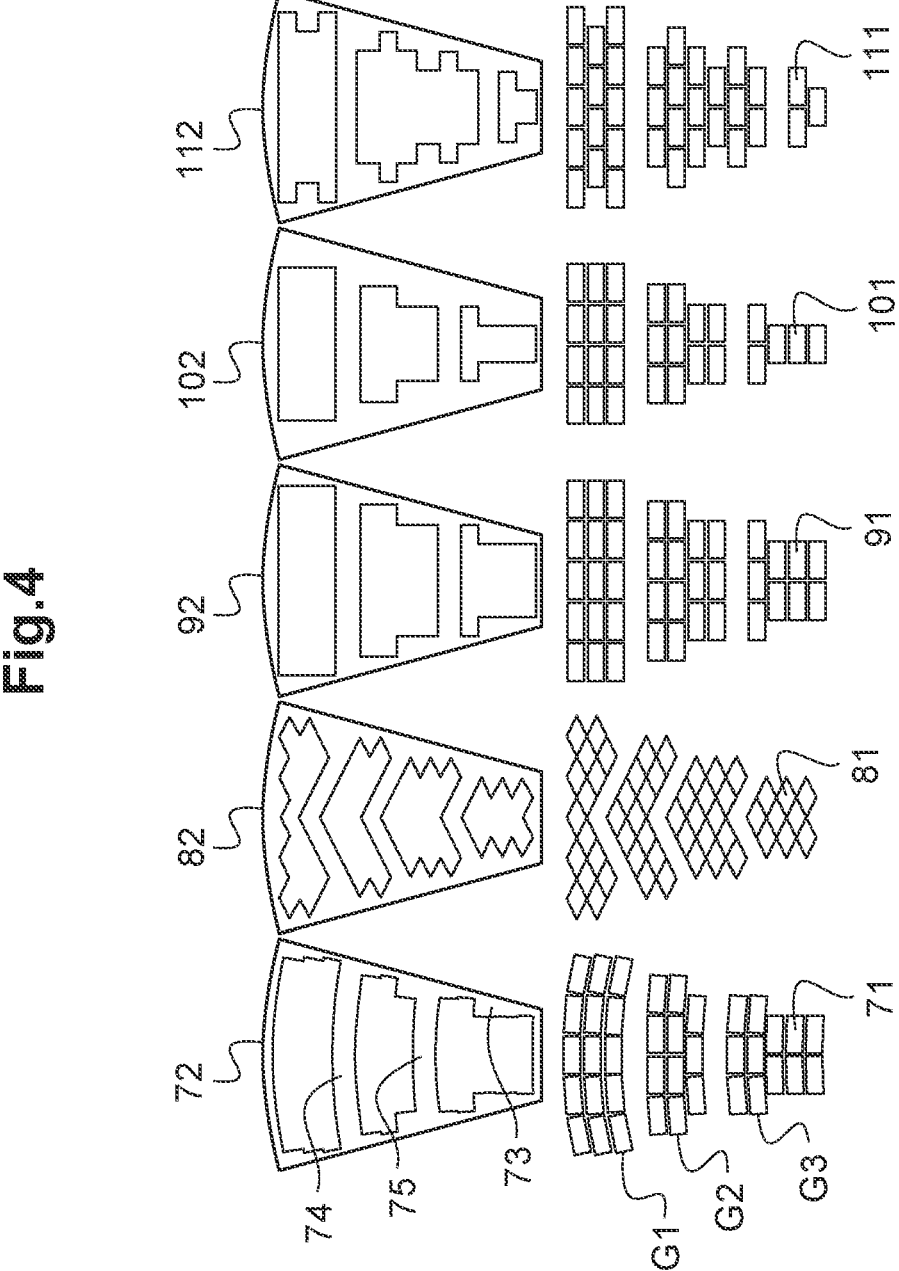
FIG. 4 illustrates five other embodiments of an element with magnetic poles which can be used in the rotor of FIG. 2.
Figure 5:
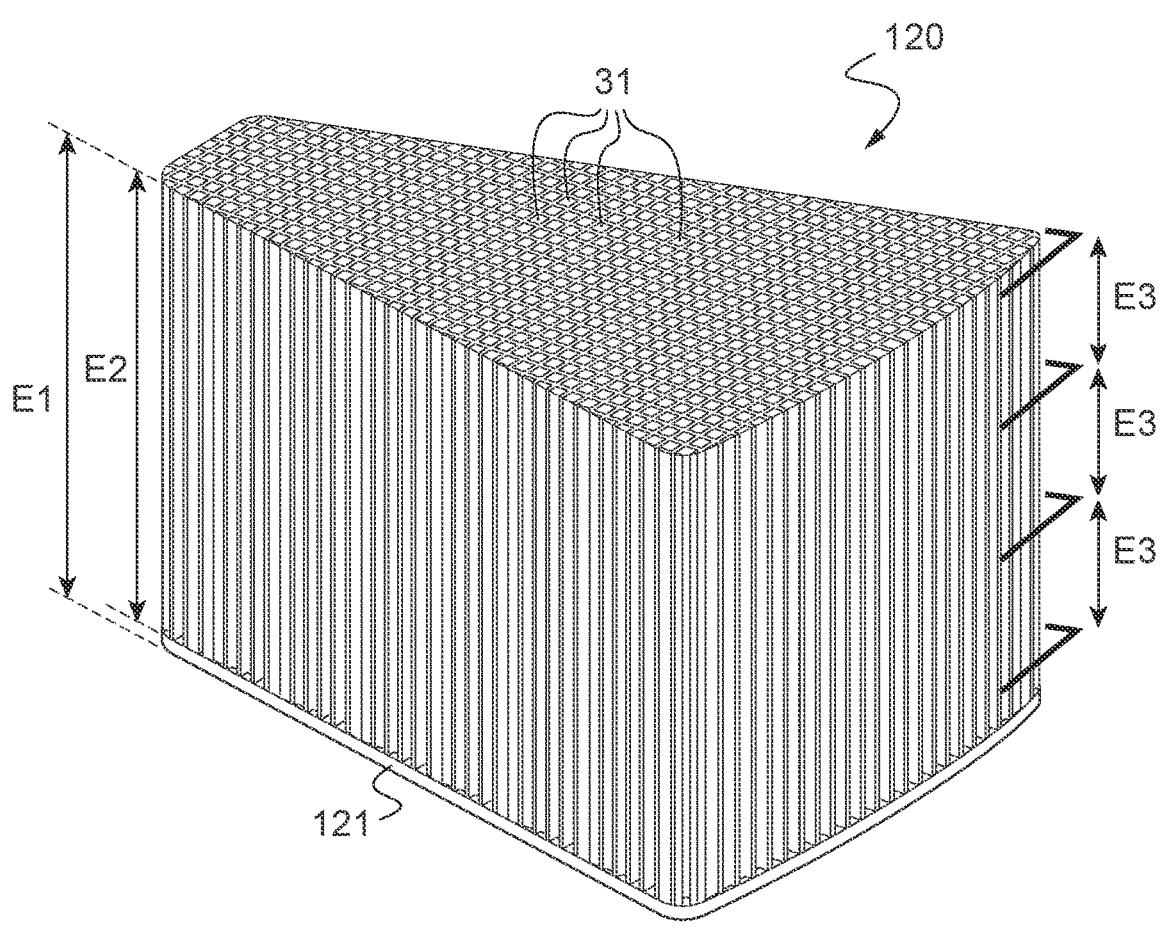
FIG. 5 illustrates a magnet block making it possible to manufacture the individual elements of three elements with magnetic poles in the rotor of FIG. 2.

In FIGS. 3 and 4, ten configurations which can be used to manufacture the elements with magnetic poles 20 have been represented.

In these ten embodiments, the individual magnets are distributed, such that the distance between the edge of the individual magnet assembly and the peripheral edge of the element with magnetic poles 20 is not constant, even though the thickness of the flange varies along its contour. The flange is indeed provided to fill all the space delimited by the individual magnet assembly and the housing 14 provided in the body 10.

In FIG. 3, five embodiments of the element with distinct magnetic poles 20 have been specifically represented, wherein the individual magnet assembly 21 of the element with magnetic poles 20 are distributed in one single group.

An individual magnet group 21 is, in this case, defined as an assembly of several individual magnets 21 within which each individual magnet 21 is in contact with at least one other individual magnet 21 by way of a thin insulating resin or glue layer.

In this FIG. 3, the components represented on the top line correspond to the five embodiments of the flange 22, 32, 42, 52, 62, while the components represented on the bottom line illustrate, for these five embodiments, the arrangement of the individual magnets 21, 31, 41, 51, 61 used.

In the first embodiment, the individual magnets 21 have rectangular cross-sections and are distributed over several lines within which they are positioned side-by-side. These lines are, in this case, curved to follow the curvature of the outer side of the peripheral side of the element with magnetic poles 20. In this case, thirteen lines are provided, containing two to five individual magnets 21.

The idea is, in this case, given the width and the thickness of the individual magnets 21 and the volume of the element with magnetic poles 20, to maximise the number of individual magnets 21 within each line and the number of lines.

The arrangement of the individual magnets 21 in curved lines further makes it possible to ensure a good resistance to mechanical stresses and good magnetic performance.

In the second embodiment, the individual magnets 31 have diamond-shaped cross-sections and are distributed in a staggered manner, on several lines overlapping one another. These lines are, in this case, straight, and twenty-two lines are provided, containing one to five individual magnets 21 immobilised together by the flange 32.

In a variant, the individual magnets could have hexagonal-shaped cross-sections.

The idea, in this second embodiment, is to ensure that no free space is left between the individual magnets 31, except the space necessary for the gluing of the individual magnets 31 together, the glue itself also being able to be a polymer comprising the magnet powder.

In the third embodiment, the individual magnets 41 have rectangular cross-sections and are distributed over several lines within which they are positioned side-by-side. These lines are straight in this case, and thirteen lines are provided, containing two to five individual magnets 41 immobilised together by the flange 42.

The fourth embodiment, is distinguished from the third in this sense that it comprises one individual magnet 51 less per line. In this embodiment, the flange 52 is thus thicker than in the third embodiment, such that the manufacturing cost of the rotor 1 is limited.

In the fifth embodiment, the individual magnets 61 have rectangular cross-sections and are distributed over several lines within which they are positioned side-by-side. These lines are straight in this case, and thirteen lines are provided, containing one to five individual elements 61 immobilised together by the flange 62.

In this embodiment, and contrary to the abovementioned embodiments, the number of individual magnets per line does not increasingly vary from the inner side to the outer side of the peripheral edge of the element with magnetic poles 20. On the contrary, in this case, this number varies alternatively, by increasing then decreasing from one line to the other.

In this embodiment (like in the second embodiment), the flange 62 thus makes it possible to radially retain the individual magnets 61 located on the sides when the rotor 1 rotates and is subjected to centrifugal stresses.

It will be noted that the fourth and fifth embodiments are more effective than the third embodiment (they generate weaker vibrations and noises, since the stator is subjected to more of a sinusoidal magnetic field). However, the third embodiment is probably the best, if it is sought to maximise the torque or the power over a short duration.

According to a variant, the first (or third) embodiments could be combined with the fifth asymmetrically. Individual magnets according to the first embodiment would be slid in a staggered manner such that the structure almost resembles that according to the fifth embodiment.

In a sixth embodiment not represented in the figures, the individual magnets are distributed like in the first embodiment. However, individual magnet pieces are further provided (for example, debris from cracking or from lesser quality magnets) all placed around the individual magnet group, so as to maximise the number of these magnets in the element with magnetic poles.

In FIG. 4, five other distinct embodiments have been represented, wherein the individual magnets of the element with magnetic poles 20 are distributed in several distinct groups.

The flange thus extends between the different groups, ensuring a better immobilisation of the individual magnets.

In this figure, the components represented on the top line correspond to five embodiments of the flange 72, 82, 92, 102, 112, while the components represented on the bottom line illustrate, for these five embodiments, the arrangement of the individual magnets 71, 81, 91, 101, 111 used.

In the seventh embodiment and like in the first embodiment, the individual magnets 71 have rectangular cross-sections and are distributed over several curved lines within which they are positioned side-by-side. These lines are distributed in three groups, a first group G1 of which of three lines each containing five individual magnets, a second group G2 of three lines each containing three or four individual magnets, and a third group G3 of five lines each containing two or three individual magnets.

In this embodiment like in all the embodiments described below, the flange 72 is provided to fill the space delimited by the housing 14 and the three groups G1, G2, G3 of individual magnets 71. It thus comprises a peripheral part 73 which extends all around the individual magnet groups 71, and two branches 74, 75 which extend between the three individual magnet groups 71.

In the eighth embodiment like in the second embodiment, the individual magnets 81 have diamond-shaped cross-sections and are distributed in a staggered manner. There are four magnet groups, in this case, and are separated two-by-two by chevron-shaped spaces, the tops of which are facing outwards. This arrangement ensures a better rigidity on the whole.

In ninth and tenth embodiments, the individual magnets 91, 101 have rectangular cross-sections and are distributed over several straight lines within which they are positioned side-by-side. These lines are, in this case, distributed in three groups of 3 or 4 lines.

In the eleventh embodiment, the individual magnets 111 have rectangular cross-sections are distributed over several straight lines. In this embodiment like in the third embodiment, the lines comprise a number of individual magnets 111 which does not increasingly vary from inside to outside of the rotor, such that one line out of around two is set in the flange 112. These lines are, in this case, distributed in three groups of two to five lines.

The element with magnetic poles 20 can be fixed in various ways in its housing 14.

In particular, it can be provided, or not, to use glue.

In the example represented in FIG. 2, the side edges of the peripheral edge of the element with magnetic poles 20 are flat, such that a glue is necessary to ensure this fixing.

In a variant, these side edges could not be flat, such that they can be interlocked in a corresponding shape provided on the body 10.

As examples, these side edges could be equipped with grooves or rectilinear ridges, or could have zig-zag shapes.

Four embodiments of a method for assembling the rotor 1 represented in FIG. 2 can now be described.

In a first embodiment, this method comprises five main steps.

The first step consists of manufacturing the body 10. This step can be carried out in various ways, for example by cutting a metal strip of adapted thickness or by cutting a glass fibre- or carbon fibre-based composite material.

This first step could, in a variant, be carried out in another way, for example by cutting then assembling several thin metal layers.

The second step consists of gluing together the individual magnets 21 of each group of each element with magnetic poles 20. This step can be carried out by using a glue. This glue is, for example, a polymer comprising the magnet powder. In a variant, adhesive strips can be used, that can be placed between each line of individual magnets so as to fix them together.

During a third step, these assembled individual magnet groups 21 are placed in moulds of shapes identical to the shapes of the housings 14 of the body 10. They are centred in these moulds, then the mixing of polymer and magnet powder is cast in the moulds. The polymer is then polymerised, such that each element with magnetic poles 20 forms a one-piece and mould-releasable rigid assembly.

In this case, it will be noted that the first step can be carried out before, during or after these second and third steps.

During a fourth step, the elements with magnetic poles 20 obtained are installed in the housings 14 of the body 10.

Finally, during a fifth step, the body 10 and the elements with magnetic poles 20 are glued together, for example, by covering them fully with a varnish or glue layer. Other fixing types can be considered (interlocking in sliders, etc.).

In a second embodiment, this method comprises four main steps.

The first and second steps consist, like in the first embodiment, of manufacturing the body 10 and of assembling the individual magnets 21 by group.

The third step consists of placing these individual magnet groups 21 directly in the housings 14 of the body 10, then of centring them.

During a fourth step, the mixture of polymer and magnet powder is cast in the housings 14 and on the body 10, so as to cover all of the rotor 1. This material is then polymerised such that this assembly is rigid.

Thus, different from the first embodiment, in this second embodiment, the housings 14 serve as a mould for manufacturing the elements with magnetic poles 20.

In a third embodiment, this method comprises three main steps.

The first step consists, like in the first embodiment, of manufacturing the body 10.

The second step consists of placing and arranging the independent individual magnets 21 in the housings 14 of the body 10. These individual magnets are, in this case, qualified as independent in this sense that they have not been at this stage assembled by group.

During a third step, the mixture of polymer and magnet powder is cast in the housings and on the body, so as to cover all of the rotor 1. This material is then polymerised such that this assembly is rigid.

In a fourth embodiment, this method mainly comprises five steps. This fourth embodiment can be considered for the embodiments of the elements with magnetic poles, the individual magnets (31) of which form rectilinear lines together, like for example, in the second embodiment illustrated in FIG. 3 (this method thus also applies to the third, fourth and fifth embodiments).

The first step consists, like in the first embodiment, of manufacturing the body 10.

The second step consists of creating, for each element with magnetic poles, a one-piece group of individual magnets by cutting magnet blocks 120 over a thickness E2 less than the thickness E1 of the magnet block 120 corresponding at least to the thickness of the rotor, by leaving a base 121 uncut, holding the future individual magnets 31 together. These magnet blocks 120 are large magnets, the shape of which is, for example, mainly that of the element with magnetic poles to be created. They are sawn, for example, by sawing with a dicing saw, to obtain individual magnet groups 31 having the desired configuration. The thickness of a magnet block in the axial direction, wherein it will be mounted on the rotor is greater than the thickness of the rotor, in order to keep a base 121 uncut of the magnet block enabling the holding of the individual magnets 31 created in this second step, before the injection of the thermosetting material. If the thickness of the magnet block allows, this is cut over a thickness E3 equal to several times the thickness of the rotor, in order to be able to saw in the fourth step, several elements with magnetic poles in the magnet block polymerised in the third step. It must be noted that this step, the magnet blocks 120 are not necessarily already magnetised, they can be so in a subsequent step, in particular after the thermosetting of the material. Then, preferably, the dust from the sawing is cleaned up.

During a third step, these individual magnet groups 31 held by a base 121 are placed in moulds of shapes identical to the shapes of the housings 14 of the body 10. They are centred in these moulds, the base 121 being held outside of the mould, then the mixture of polymer and magnet powder is injected into the moulds, filling the gaps between magnets and creating the flanges around the magnet groups. The polymer is then polymerised such that each magnet group polymerised with its flanges forms a one-piece and mould-releasable, rigid assembly.

During a fourth step, the base 121 of the magnet blocks 120, and optionally slices of the magnet blocks are cut, to obtain the elements with magnetic poles 20.

During a fifth step, each element with magnetic poles 20 is installed in each housing 14 of the body 10.

It must be noted that the elements with magnetic poles are not necessarily glued to the body 10 of the rotor, types of assembly without glue, for example, by sliders present on the branches of the rotor body 10, being able to be considered.

Whatever the embodiment used, the rotor 1, once assembled, can then be fitted on the transmission shaft of the engine, then be placed in an adapted casing, between the two stators 3.

The present invention is not at all limited to the embodiments described and represented, but a person skilled in the art will know how to provide any variant according to the invention.

The invention claimed is:

1. An element with magnetic poles for a rotor of an axial flux electric machine, the element with magnetic poles comprising:

an assembly of a plurality of individual magnets distributed in at least two distinct groups within which each individual magnet is in contact with at least one other individual magnet by a glue or resin layer; and a flange including a first part at least surrounding said assembly of individual magnets to immobilize the individual magnets in position, and a second part extending between the at least two distinct groups, at least one portion of the flange being made of a material comprising a mixture of polymer and magnet powder.

2. The element with magnetic poles according to claim 1, wherein the flange is fully made of said material.

3. The element with magnetic poles according to claim 2, wherein the polymer is of the thermosetting type.

4. The element with magnetic poles according to claim 1, wherein the polymer is of the thermosetting type.

5. A rotor for an axial flux electric machine, the rotor comprising:

a disc-shaped body which is centered on an axis of rotation and which delimits at least one housing which houses the element with magnetic poles according to claim 1.

6. An axial flux electric machine comprising:

at least one rotor according to claim 5; and at least one disc-shaped stator centered on the axis of rotation.

7. A method for assembling the rotor according to claim 5, the method comprising steps of:

manufacturing the disc-shaped body;

gluing the individual magnets in at least one one-piece group; then casting said material on the individual magnets and polymerizing said material to form the at least one element with magnetic poles;

installing each of the at least one element with magnetic poles in each of the at least one housing of the disc-shaped body; and fixing each of the at least one element with magnetic poles on the disc-shaped body.

8. A method for assembling the rotor according to claim 5, the method comprising steps of:

manufacturing the disc-shaped body;

creating at least one one-piece individual magnet group by cutting a magnet block over a thickness corresponding at least to the thickness of the rotor, by leaving a base uncut of said magnet block holding said individual magnets together;

casting said material on the individual magnets and polymerizing said material;

cutting the base to form the at least one element with magnetic poles; and installing each of the at least one element with magnetic poles in each of the at least one housing of the disc-shaped body.

9. A method for assembling the rotor according to claim 5, the method comprising steps of:

manufacturing the disc-shaped body;

gluing the individual magnets in at least one one-piece group;

installing the individual magnets in each of the at least one housing of the disc-shaped body; and casting said material on the individual magnets and the disc-shaped body, and polymerizing said material.

10. A method for assembling the rotor according to claim 5, the method comprising steps of:

manufacturing the disc-shaped body;

installing each of the individual magnets in each of at least one housing of the disc-shaped body; and casting said material on the individual magnets and the disc-shaped body, and polymerizing said material.

* * * * *